US008659257B2

(12) United States Patent
Antraygue

(10) Patent No.: US 8,659,257 B2
(45) Date of Patent: Feb. 25, 2014

(54) ELECTRONIC OPERATIONAL CONTROL DEVICE FOR A PILOTING MEMBER WITH CROSS-MONITORING, PILOTING DEVICE AND AIRCRAFT

(75) Inventor: Cedric Antraygue, Villefranche de Rouergue (FR)

(73) Assignee: Ratier Figeac, Figeac (FR)

( * ) Notice: Subject to any disclaimer, the term of this patent is extended or adjusted under 35 U.S.C. 154(b) by 595 days.

(21) Appl. No.: 12/941,288

(22) Filed: Nov. 8, 2010

(65) Prior Publication Data
US 2011/0108673 A1 May 12, 2011

(30) Foreign Application Priority Data
Nov. 6, 2009 (FR) ...................... 09 05343

(51) Int. Cl.
*B25J 19/02* (2006.01)
(52) U.S. Cl.
USPC ....... 318/568.16; 318/632; 244/221; 244/229
(58) Field of Classification Search
USPC .................. 318/568.16, 632; 244/221, 229
See application file for complete search history.

(56) References Cited

U.S. PATENT DOCUMENTS

| | | | |
|---|---|---|---|
| 5,291,113 A | | 3/1994 | Hegg et al. |
| 5,694,014 A | | 12/1997 | Hegg et al. |
| 5,900,710 A | | 5/1999 | Gautier et al. |
| 6,000,662 A | * | 12/1999 | Todeschi et al. ............ 244/223 |
| 6,572,055 B1 | * | 6/2003 | Bernard ..................... 244/229 |
| 6,986,249 B2 | * | 1/2006 | Bernard ....................... 60/571 |
| 7,474,944 B2 | * | 1/2009 | Cartmell et al. ................. 701/3 |
| 7,567,862 B2 | * | 7/2009 | Pelton et al. ................ 701/33.8 |
| 7,878,461 B2 | * | 2/2011 | Hirvonen et al. ............ 244/223 |
| 8,078,340 B2 | * | 12/2011 | Johnson et al. .................. 701/3 |
| 8,352,098 B2 | * | 1/2013 | Sataka .............................. 701/3 |
| 2005/0080495 A1 | | 4/2005 | Tessier et al. |
| 2007/0164168 A1 | | 7/2007 | Hirvonen et al. |

FOREIGN PATENT DOCUMENTS

| | | |
|---|---|---|
| EP | 0759585 A1 | 2/1997 |
| EP | 0835802 A1 | 4/1998 |
| EP | 0844171 A1 | 5/1998 |
| EP | 1918196 A1 | 5/2008 |

OTHER PUBLICATIONS

French Search Report, dated Jun. 15, 2010, from corresponding French application.

* cited by examiner

*Primary Examiner* — Erick Glass
(74) *Attorney, Agent, or Firm* — Young & Thompson

(57) ABSTRACT

An electronic operational control device for an aircraft piloting device with two connected piloting members, includes electronic circuits for main monitoring from signals delivered by sensors associated with one of the piloting members, and at least one electronic circuit (52 to 55) for cross-monitoring, for digital processing of signals delivered by sensors (83, 93) associated with the other piloting member, adapted to detect any deviation of these signals corresponding to a fault and to generate a signal representing such a fault. A piloting device and an aircraft including such an electronic operational control device with cross-monitoring are also disclosed.

33 Claims, 7 Drawing Sheets

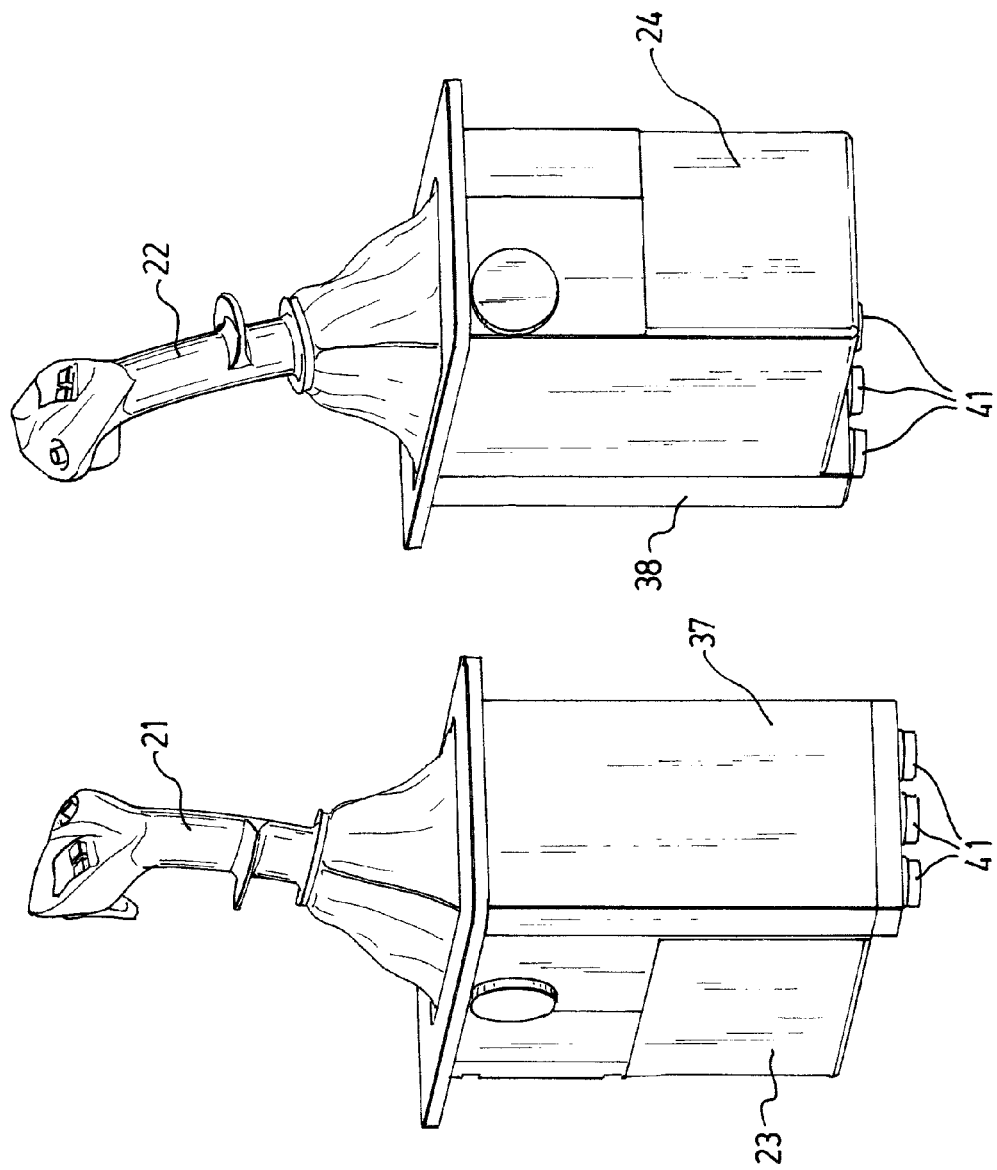

ELECTRONIC OPERATIONAL CONTROL DEVICE FOR A PILOTING MEMBER WITH CROSS-MONITORING, PILOTING DEVICE AND AIRCRAFT

BACKGROUND OF THE INVENTION

1. Field Of The Invention

The invention relates to an electronic operational control device for a piloting member, called the controlled piloting member, of an aircraft comprising a piloting device equipped, for each flying member of the aircraft, with two such piloting members connected (by a completely mechanical kinematic chain or at least partly electrically) to this flying member, so that the aircraft can be piloted simultaneously by two people: a captain and a copilot. Throughout the text, the term "piloting" and its derivatives denote, unless otherwise stated, the flying of an aircraft by at least one human pilot operating at least one piloting member such as a stick, handle, rudder bar, pedal, etc., connected to at least one flying member such as a control surface or a throttle control of the aircraft, etc. The term "command" and its derivatives denote in the traditional manner in aeronautics the fact of supplying a device with signals which bring about a predetermined action of said device. The term "monitor" and its derivatives denote in the traditional manner in aeronautics the fact of processing measurements carried out on a device and comparing them with predetermined values to detect the occurrence of operating faults (i.e. faults arising from any failure in a system (device and/or software), as opposed in particular to use faults arising not from a failure, but from errors of a user (pilot or copilot) or from the aircraft departing from its flight envelope). An operational control device for a piloting member is a device having at least one monitoring function for this piloting member, and also being able to perform other functions, in particular for commanding this piloting member.

2. Description Of The Related Art

A piloting device comprising servo coupling (logically and electronically) of a pilot's stick and a copilot's stick has already been proposed. Motors enable simulation of the feel of traditional mechanical sticks and the tracking of each stick by the other.

US 2005/0080495 describes such a piloting device employing a centralised flight computer and making it possible to obtain coupling of the sticks of a pilot and a copilot. This device also makes it possible to supply a summed signal of the commands of the two pilots. Such a device makes it possible to detect piloting faults, i.e. commands given by the copilot conflicting with those given by the pilot (or a command of the pilot conflicting with that of the automatic pilot) and to deactivate the coupling between the two sticks. This device does not perform a monitoring function.

In addition, such a device poses the problem of its reliability and of monitoring the occurrence of possible operating faults (failures) to ensure good operating safety.

EP 0 759 585 poses this problem and points out that such aeronautical systems must be fault tolerant and in particular integrate redundant devices. The solution recommended by this document consists in providing, for each piloting stick, on the one hand complete redundancy of the motors, detection sensors and circuits for generating force feedback sensations, and on the other hand connected command and monitoring computers for "self-monitoring" the command signal of the motor associated with this stick, comparing it with a motor current signal, and comparing measured voltage signals with a reference signal, the monitoring computer monitoring the command computer, the two computers being capable of deactivating the motor. Such a solution, which is traditional in its principle, is heavy, complex and costly in its implementation and its operation. In particular, it requires a specific monitoring computer for each stick. In addition, it remains imperfect insofar as certain failures which are liable to occur on such a monitoring computer will not necessarily be detected themselves.

BRIEF SUMMARY OF THE INVENTION

The invention therefore aims to overcome these disadvantages by proposing an electronic operational control device which has improved reliability and operating safety, in particular makes it possible to detect also any failure liable to occur on a circuit used for the monitoring of the operation of the device, which remains operational in the event of a fault occurring on any of its components, and which moreover is simple, light, compact, inexpensive and compatible with its implementation on an industrial scale on board any aircraft, including on board an aircraft already in operation.

More particularly, the invention aims to propose such an operational control device which is simple, inexpensive to design, to manufacture, and in its operation, including in terms of energy consumption.

Throughout the text, the term "adapted to" applied to a device such as a circuit is used in the usual way to denote a technical function performed by this device.

The invention therefore relates to an electronic operational control device for a piloting member, called the controlled piloting member, of an aircraft piloting device comprising said controlled piloting member and another piloting member, called the other piloting member, these two piloting members being both connected to at least one same flying member of the aircraft, said controlled piloting member being mounted on a first electromechanical supporting box with at least one degree of freedom, said first electromechanical supporting box comprising, for each degree of freedom, at least one motor for actuating the controlled piloting member, said other piloting member being mounted on a second electromechanical supporting box with at least one degree of freedom, said second electromechanical supporting box comprising, for each degree of freedom, at least one motor for actuating said other piloting member, this electronic operational control device comprising:
- inputs, called main monitoring inputs, for receiving signals delivered by sensors associated with the controlled piloting member,
- electronic circuits, called main monitoring circuits, for digital processing of the signals received at the main monitoring inputs, adapted to detect any deviation of these signals corresponding to an operating fault and to generate a signal representing such an operating fault, characterised in that it comprises:
- inputs, called cross-monitoring inputs, for receiving signals, called cross-monitored signals, delivered by sensors associated with the other piloting member,
- at least one electronic circuit, called the cross-monitoring circuit, for digital processing of said cross-monitored signals delivered by sensors associated with the other piloting member, said cross-monitoring circuit being adapted to detect any deviation of said cross-monitored signals corresponding to an operating fault and to generate a signal representing such an operating fault, and in that it is encapsulated in a box adapted to be able to be mounted on said electromechanical supporting box of the controlled piloting member.

Thus, an electronic operational control device according to the invention makes it possible to carry out cross and redundant monitoring of the two piloting members, enabling detection of any operating fault of one of the piloting members and/or of an actuating motor and/or of an electronic circuit associated with one of the piloting members—in particular an electronic circuit incorporated in a command/monitoring unit of one of the piloting members, including the device according to the invention incorporated in such a unit. The monitoring carried out is redundant in the sense that the failure of any one of the cross-monitoring circuits or of such a control device according to the invention is necessarily detected, and that the device is tolerant of a single failure. In addition, this monitoring is obtained extremely simply and economically, without addition of a specific monitoring computer, and therefore avoiding the costs, complexity, energy consumption, weight and bulk of such an additional monitoring computer.

Furthermore, advantageously and according to the invention, said cross-monitoring inputs have at least one input for receiving at least one cross-monitored position signal of the other piloting member, delivered by a position sensor associated with this other piloting member. Preferably, advantageously and according to the invention, said cross-monitoring inputs additionally have at least one input for receiving at least one velocity signal of the other piloting member, delivered by a velocity sensor associated with this other piloting member. Preferably, advantageously and according to the invention, said cross-monitoring inputs additionally have at least one input for receiving at least one acceleration signal of the other piloting member, delivered by an acceleration sensor associated with this other piloting member.

Likewise, advantageously and according to the invention, said cross-monitoring inputs have at least one input for receiving at least one cross-monitored force signal, representing the forces actually exerted on the other piloting member, delivered by a force sensor associated with said other piloting member, and said cross-monitoring circuit is adapted to compare a value, called the force measured value, determined at least from said cross-monitored force signal, with a predetermined and/or measured and/or calculated reference value. In addition, advantageously and according to the invention, said reference value is a value calculated according to a predetermined law from at least one position signal of the other piloting member. Preferably, advantageously and according to the invention, said reference value is a value calculated also according to a predetermined law from at least one velocity signal of the other piloting member and/or also according to a predetermined law from at least one acceleration signal of the other piloting member.

Preferably, advantageously and according to the invention, said cross-monitoring circuit is adapted to compare the difference between said force measured value and said reference value with a predetermined threshold value, and to generate a signal representing an operating fault when this difference exceeds said predetermined threshold value (as an absolute value).

Advantageously and according to the invention, when the two piloting members are logically and electronically coupled one another, at least one cross-monitoring circuit is adapted to calculate an algebraic sum of a force measured value delivered by at least one force sensor associated with the controlled piloting member and of a force measured value delivered by at least one force sensor associated with the other piloting member, and to process this sum and detect any deviation of this sum corresponding to an operating fault. Advantageously and according to the invention, this sum is compared with an algebraic sum of theoretical values calculated according to predetermined laws for each piloting member as a function of the signals coming from position and/or velocity and/or acceleration sensors.

Furthermore, advantageously and according to the invention, when the two piloting members are movable with the same degrees of freedom with respect to a frame of the aircraft, an electronic operational control device according to the invention comprises a cross-monitoring circuit specific to each degree of freedom.

Furthermore, in an electronic operational control device according to the invention, each cross-monitoring circuit may be mainly formed of an electronic microcontroller adapted to carry out in particular this cross-monitoring. In this regard, it should be noted that each electronic microcontroller forming a cross-monitoring circuit may be dedicated to this cross-monitoring, or in contrast, be used for other functionalities of the device.

That being so, advantageously, an electronic operational control device according to the invention comprises, for each degree of freedom of the controlled piloting member and of the other piloting member, as main monitoring circuit, a first electronic microcontroller for the digital processing of the signals delivered by the sensors associated with the controlled piloting member, and, as cross-monitoring circuit, another electronic microcontroller which processes the signals delivered by the sensors associated with the other piloting member, each other electronic microcontroller being distinct from said first electronic microcontroller. Thus, in a device according to the invention, the microcontrollers forming the different main monitoring circuits of the controlled piloting member and cross-monitoring circuits of the other piloting member are, for each degree of freedom, distinct from one another. Each microcontroller may nevertheless be multifunctional, i.e. for example carry out the main monitoring of the controlled piloting member on one degree of freedom, and the cross-monitoring of the other piloting member on another degree of freedom.

An electronic microcontroller may also be multifunctional in the sense that it can enable on the one hand the commanding of at least one actuating motor on one degree of freedom of the corresponding controlled piloting member, and on the other hand the monitoring of the operation of at least one other degree of freedom (monitored degree of freedom) which is different from the commanded degree of freedom, i.e. which is chosen from another degree of freedom of the same controlled piloting member, and a similar or different degree of freedom of another piloting member than the controlled piloting member (in particular of a second piloting member connected to the same flying member of the aircraft).

The invention can apply to any pair of aircraft piloting members (rudder bars, sticks, wheels, mini-sticks, engine control levers, etc.). The invention applies more particularly and advantageously in the case where each piloting member is formed of a pivoting stick (this term including a mini-stick) for piloting an aircraft.

Thus, in a preferred embodiment, an electronic operational control device according to the invention is also characterised in that the two piloting members are sticks movable with respect to the frame of the aircraft on a longitudinal horizontal pivot axis to enable a roll command, and in that it comprises:

roll main monitoring inputs for receiving delivered by at least one roll angular position sensor (and preferably also at least one roll angular velocity sensor and/or at least one roll angular acceleration sensor) of the controlled piloting member, and at least one roll force sensor of the controlled piloting member, roll cross-monitoring inputs for receiving cross monitored signals delivered by at least one roll position sensor (and preferably also at least one roll angular velocity sensor and/or at least one roll angular acceleration sensor) of the other piloting member, and at least one roll force sensor of the other piloting member, a roll cross-monitoring circuit adapted to:
determine for each piloting member, a theoretical force value according to at least one predetermined law from at least roll angular position signals of this piloting member,
compare this theoretical force value with a measured force value (in particular the algebraic sum of the roll measured forces on the two piloting members when the two piloting members are electronically coupled) delivered by at least one roll force sensor of a piloting member, and generate an operating fault signal if the difference between these values is, as an absolute value, greater than a predetermined threshold value.

Likewise, advantageously an electronic operational control device according to the invention is also characterised in that the two piloting members are sticks movable with respect to the frame of the aircraft on a transverse horizontal pivot axis to enable a pitch command, and in that it comprises:

pitch main monitoring inputs for receiving signals delivered by at least one pitch position sensor (and preferably also at least one pitch angular velocity sensor and/or at least one pitch angular acceleration sensor) of the controlled piloting member, and at least one pitch force sensor of the controlled piloting member, pitch cross-monitoring inputs for receiving cross-monitored signals delivered by at least one pitch position sensor (and preferably also at least one pitch angular velocity sensor and/or at least one pitch angular acceleration sensor) of the other piloting member, and at least one pitch force sensor of the other piloting member, a pitch cross-monitoring circuit adapted to:
determine for each piloting member, a theoretical force value according to at least one predetermined law from at least pitch angular position signals of this piloting member,
compare this theoretical force value with a measured force value (in particular the algebraic sum of the pitch measured forces on the two piloting members when the two piloting members are electronically coupled) delivered by at least one pitch force sensor of a piloting member, and generate an operating fault signal if the difference between these values is, as an absolute value, greater than a predetermined threshold value.

Furthermore, according to an advantageous embodiment, an electronic operational control device according to the invention is encapsulated in a box adapted to be able to be mounted on a supporting box of the controlled piloting member. Such an electronic operational control device according to the invention can therefore be incorporated in a simple box which can be mounted directly on the electromechanical supporting box of a piloting member, and which is compatible or can be easily made compatible with all kinds of piloting members, for example equally well with a captain's piloting stick as with a copilot's piloting stick.

It should be noted in this regard that an electronic operational control device according to the invention can be designed perfectly symmetrically in its connection and in its operation, so that it applies equally well to a pilot's stick as to a copilot's stick, without requiring hardware or software modifications. Thus, a same box comprising an electronic operational control device according to the invention can be mounted and connected alternatively equally well on the electromechanical supporting box of a pilot's stick as on the electromechanical supporting box of a copilot's stick. This results particularly in considerable savings in terms of manufacture on an industrial scale.

It should also be noted that an electronic operational control device according to the invention can be incorporated inside a general control device of the piloting member, in particular in an electronic control unit incorporating command logic whose function is on the one hand to ensure the operational coupling of the two piloting members, and on the other hand to perform the commanding of motors associated with the degrees of freedom of the piloting member so as to achieve an electrically simulated variable force feedback sensation.

The invention also covers a piloting device of an aircraft comprising two piloting members both connected to at least one same flying member of the aircraft, characterised in that it comprises, for each piloting member, an electronic operational control device according to the invention specific to each piloting member. Thus, a piloting device according to the invention comprises two electronic operational control devices according to the invention, one for each piloting member, and each electronic operational control device is associated with one of the two piloting members (in particular incorporated in a box mounted on its electromechanical supporting box) and carries out a main monitoring of the piloting member with which it is associated and a cross-monitoring of the other piloting member.

Advantageously and according to the invention, the two electronic operational control devices with cross-monitoring are identical. In fact, they are symmetrical in their design, their connection and their operation. It should be noted in this regard that an electronic operational control device according to the invention is incorporated directly in the piloting member and fixed to its electromechanical supporting box, and is therefore not formed of a system outside the two piloting members (as would be the case for example of a centralised device interposed between the two piloting members).

The invention applies furthermore particularly advantageously to the case of so-called active piloting members, i.e. ones equipped with command motors and circuits which generate a simulated force feedback sensation on each degree of freedom of the piloting member. In fact, the electronic operational control devices with cross-monitoring according to the invention can then carry out a particularly effective monitoring of these command motors and circuits. Thus, advantageously, in a piloting device according to the invention, each piloting member is mounted on an electromechanical supporting box comprising, for each degree of freedom, at least one motor for actuating the piloting member, and a device for commanding each actuating motor adapted to create an electrically simulated variable force feedback sensation in the piloting member. Advantageously and according to the invention, the two piloting members are electronically coupled to one another, the piloting device comprising at least one command unit capable of carrying out such an electronic coupling by automatic control. Nevertheless, the invention applies also to a piloting device in which the two piloting members are not coupled, but on the contrary are independent of one another.

The invention also covers an aircraft characterised in that it comprises at least one piloting device according to the invention, in particular a piloting device comprising two roll and pitch piloting sticks. In an aircraft according to the invention, each piloting stick is equipped with an electronic operational control device with cross-monitoring according to the invention.

The invention also relates to an electronic operational control device, a piloting device and an aircraft characterised in combination by all or part of the features mentioned above or below.

BRIEF DESCRIPTION OF THE DRAWINGS

Other objects, features and advantages of the invention will become apparent on reading the following description which refers to the appended figures showing, by way of non-limiting example, a preferred embodiment of the invention, and in which:

FIG. 1 is a diagrammatic partial perspective representation of two piloting members of a piloting device according to the invention.

DETAILED DESCRIPTION OF THE PREFERRED EMBODIMENTS

FIG. 1 shows a piloting device according to the invention which, in the example, comprises two pivoting mini-sticks 21, 22 for piloting an aircraft, one, 21, of which is intended to be used by the captain, and the other, 22, of which is intended to be used by the copilot.

Figure 2:
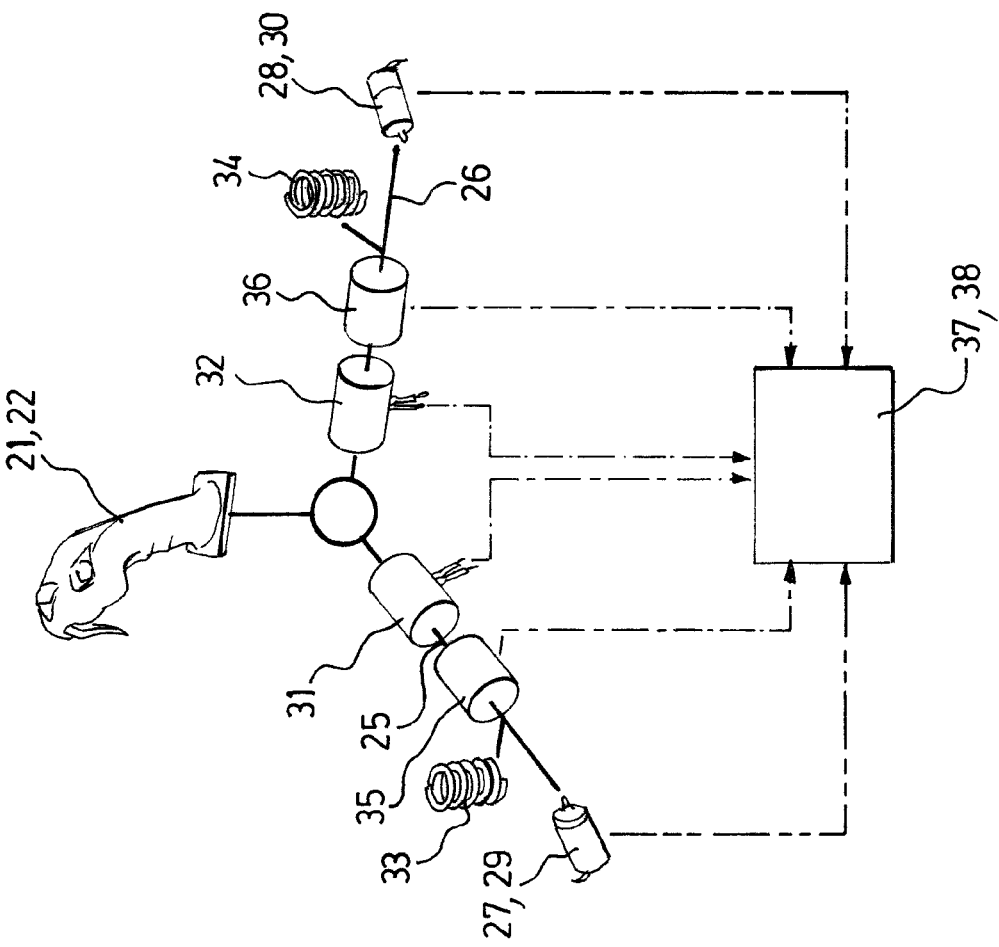
FIG. 2 is a diagrammatic representation showing the main components of a piloting member of FIG. 1.

Each mini-stick 21, 22 is mounted on an electromechanical supporting box 23 and 24, respectively, which incorporates (FIG. 2) in particular the kinematics for guiding the mini-stick in rotation about the pitch axis 25 and the roll axis 26, and, for each of these axes, at least angular position sensors 27, 28, preferably also angular velocity sensors 29, 30 (in a variant not shown also angular acceleration sensors), and force sensors 31, 32, return springs 33, 34 associated with levers making it possible to return the mini-stick to the neutral position, and actuating motors (namely two motors 35a, 35b and 36a, 36b per axis, shown and designated collectively by the references 35, 36 in FIG. 2) making it possible in particular to impart a torque to the mini-stick in order to create an electrically simulated variable force feedback sensation. The angular position sensors 27, 28 may comprise sensors which detect the angular position of the mini-stick 21, 22 itself and/or sensors which detect the angular position of the drive shaft of at least one—in particular each—actuating motor 35, 36. All the sensors are arranged to supply signals continuously and in real time.

Such piloting members and their electromechanical supporting box are well known per se and will not be described in more detail. The invention further applies to all types of piloting members, including for example rudder bars, engine control levers of the aircraft, etc. It applies to piloting members which may comprise any number of degrees of freedom chosen from rotations and translations.

Figure 3:
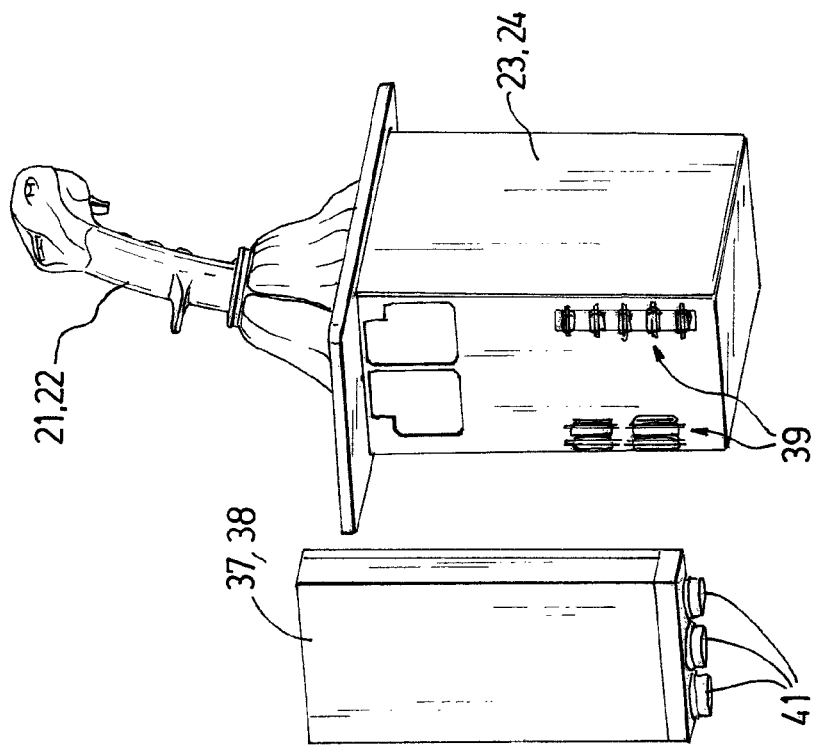
FIG. 3 is a diagrammatic partially exploded perspective representation of a piloting member of FIG. 1.

Each electromechanical supporting box 23, 24 receives a second box, called the control box 37, 38, which incorporates an electronic command/monitoring unit 47, 48 associated with the corresponding piloting member 21 and 22, respectively. As shown in FIG. 3, this control box 37, 38 is directly mounted by screws on a vertical face of the electromechanical supporting box 23, 24, and these two boxes 37, 38 and 23, 24 are electrically connected to one another via appropriate connectors 39. The connectors borne by the vertical face of the electromechanical supporting box 23, 24 are electrically connected to the various electrical elements incorporated inside this box, i.e. the above-mentioned sensors and motors.

Each control box 37, 38 is also equipped with connectors 41 enabling its connection to the control box 38, 37 associated with the other piloting member (in particular for the transmission of signals enabling the cross-monitoring described below), and to various other electrical systems and/or computer systems of the aircraft, in particular an automatic piloting computer system.

Figure 4:
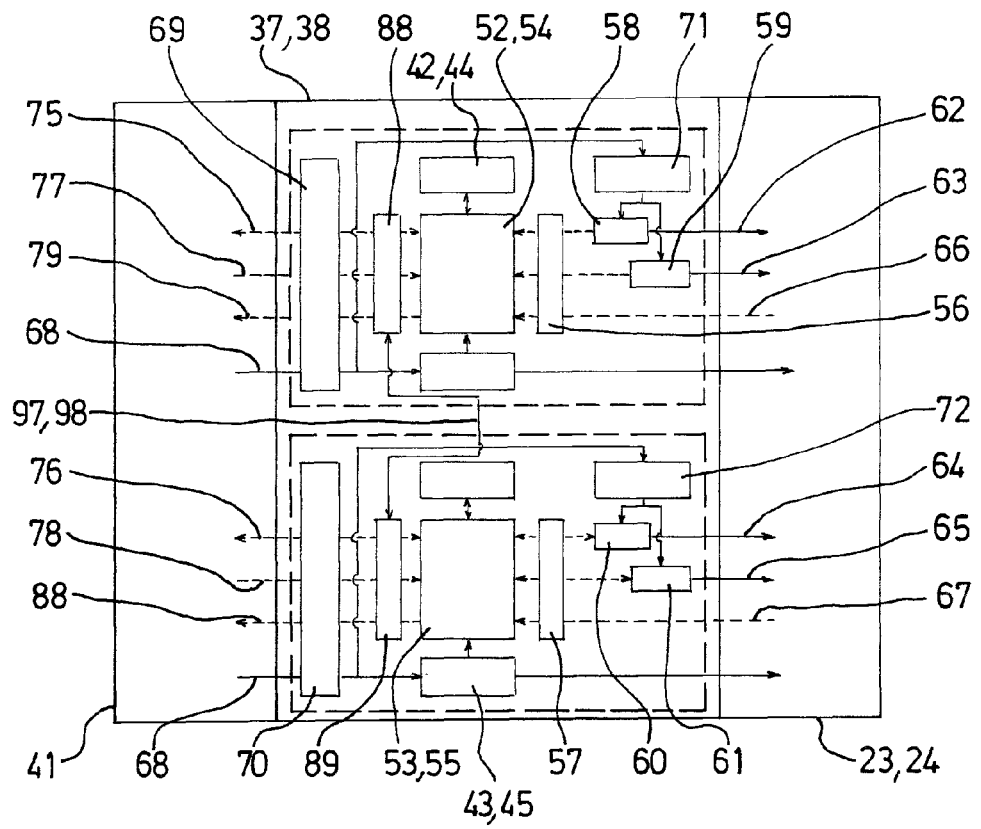
FIG. 4 is a block diagram illustrating the general architecture of a control unit of a piloting member incorporating an electronic operational control device according to the invention.

FIG. 4 shows diagrammatically the general architecture of an electronic command/monitoring unit 47, 48 incorporated in one of the control boxes 37, 38. In this figure, the electromechanical box 23, 24 is schematised on the right, and the external connectors 41 are schematised on the left.

In the embodiment shown in the figures, each command/monitoring unit 47, 48 comprises two paths 42, 43 and 44, 45, respectively, and each path 42, 43, 44, 45 mainly comprises a single electronic microcontroller 52, 53, 55, 55. Each path makes it possible to command one of the two actuating motors of each axis of rotation at 50% of the torque which is to be produced on this axis. In other words, each electronic command/monitoring unit 47, 48 comprises only two microcontrollers 52, 53 and 54, 55, respectively, and each microcontroller is active on both axes of rotation, to command 50% of the torque on each axis of rotation via one of the two motors.

In addition, each microcontroller 52, 53, 54, 55 is also adapted to perform operational monitoring functions as described in more detail below.

As can be seen in FIG. 4, the microcontroller 52, 54 of the first path 42, 44 supplies, continuously and in real time via a formatting circuit 56, command signals 62 for the electrical supply circuit 58 of a first actuating motor coupled to the axis of rotation in roll, and command signals 63 for the electrical supply circuit 59 of a second actuating motor coupled to the axis of rotation in pitch. The microcontroller 53, 55 of the second path 43, 45 supplies, continuously and in real time via a formatting circuit 57, command signals 64 for the electrical supply circuit 60 of a third actuating motor coupled to the axis of rotation in roll, and command signals 65 for the electrical supply circuit 61 of a fourth actuating motor coupled to the axis of rotation in pitch.

Furthermore, all the sensors are duplicated and the microcontroller 52, 54 of the first path 42, 44 receives, via the formatting circuit 56, signals 66 coming, for each axis of rotation, from a first series of angular position, angular velocity and/or angular acceleration sensors, and from force sensors, and the microcontroller 53, 55 of the second path 43, 45 receives, via the formatting circuit 57, signals 67 coming, for each axis of rotation, from a second series of angular position, angular velocity and/or angular acceleration sensors, and from force sensors.

Each path 42, 43, 44, 45 is furthermore supplied with electrical energy 68, in particular DC voltage, via the external connectors 41. The supply voltage 68 is supplied to a voltage multiplier circuit 71 and 72, respectively, which supplies the supply circuits 58, 59 and 60, 61, respectively, of the motors. The supply voltage 68 is also supplied to a converter 73 and 74, respectively, of the voltage which supplies each microcontroller 52, 53, 54, 55 and also the various sensors of the electromechanical box 23, 24. Preferably, this supply voltage 68 is supplied by two different voltage sources, one supplying the microcontroller 52, 54 of the first path and one of the actuating motors 35, 36 of each axis of rotation, and the other supplying the microcontroller 53, 55 of the second path and the other actuating motor 35, 36 of each axis of rotation.

The external connectors 41 furthermore have serial ports 75 and 76, respectively, for example of the RS422 type, and also input ports 77 and 78, respectively, and output ports 79 and 80, respectively, these ports 75 to 80 communicating with the microcontroller 52, 53, 54, 55 via a filter circuit 69 and 70, respectively, and a signal shaping circuit 88 and 89, respectively.

The two paths 42, 44 and 43, 45, respectively, are also connected to one another by an internal serial bus 97 and 98, respectively.

Figure 5:
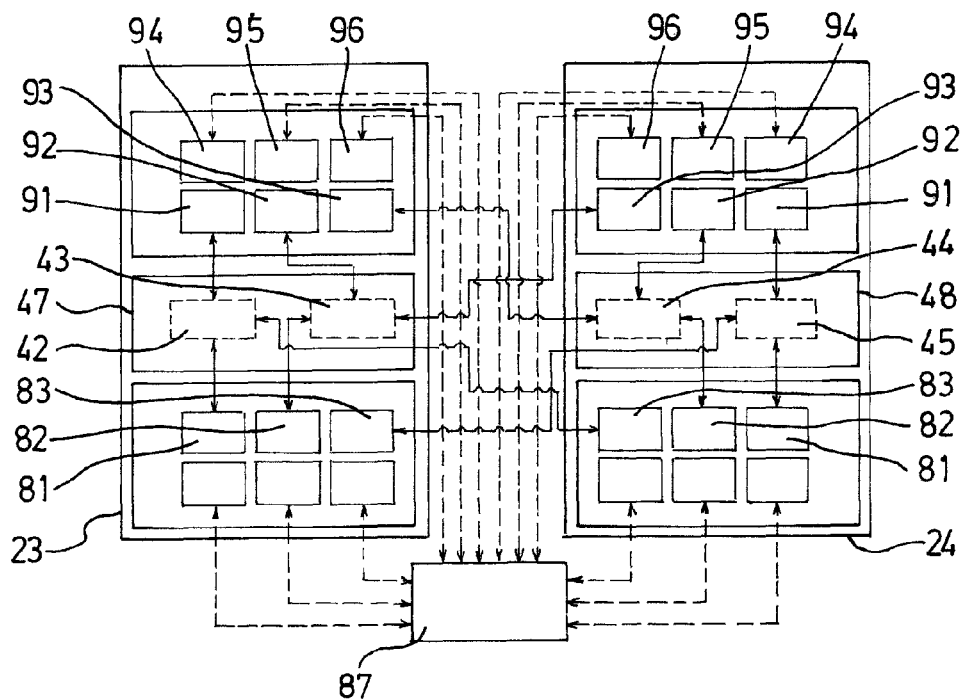
FIG. 5 is a block diagram illustrating the connections between the sensors and the different paths of the two piloting members of a piloting device according to the invention.

FIG. 5 shows an example of the equipment and connection architecture of the sensors. Each piloting member 21, 22 is equipped, for each of the axes 25, 26, with six sets of angular position sensors 27, 28, angular velocity sensors 29, 30 and force sensors 31, 32, namely:

for the pitch axis 25:
a first set 81 comprising an angular position sensor, an angular velocity sensor and a force sensor, which are connected to the first path 42, 44 of the piloting member 21, 22 considered;
a second set 82 comprising an angular position sensor, an angular velocity sensor and a force sensor, which are connected to the second path 43, 45 of the piloting member 21, 22 considered;
a third set 83 comprising an angular position sensor, an angular velocity sensor and a force sensor, which are connected to the first path 44, 42 of the other piloting member 22, 21;
a fourth set 84, a fifth set 85, a sixth set 86 comprising an angular position sensor and a force sensor, which are connected to the automatic piloting computer system 87 of the aircraft (flight command computer);
for the roll axis 26:
a first set 91 comprising an angular position sensor, an angular velocity sensor and a force sensor, which are connected to the first path 42, 44 of the piloting member 21, 22 considered;
a second set 92 comprising an angular position sensor, an angular velocity sensor and a force sensor, which are connected to the second path 43, 45 of the piloting member 21, 22 considered;
a third set 93 comprising an angular position sensor, an angular velocity sensor and a force sensor, which are connected to the second path 45, 43 of the other piloting member 22, 21;
a fourth set 94, a fifth set 95, a sixth set 96, each comprising an angular position sensor and a force sensor, which are connected to the automatic piloting computer system 87 of the aircraft (flight command computer).

The redundancy which makes it possible to guarantee that there is no single failure causing loss of detection of a parameter is thus ensured.

Figure 6:
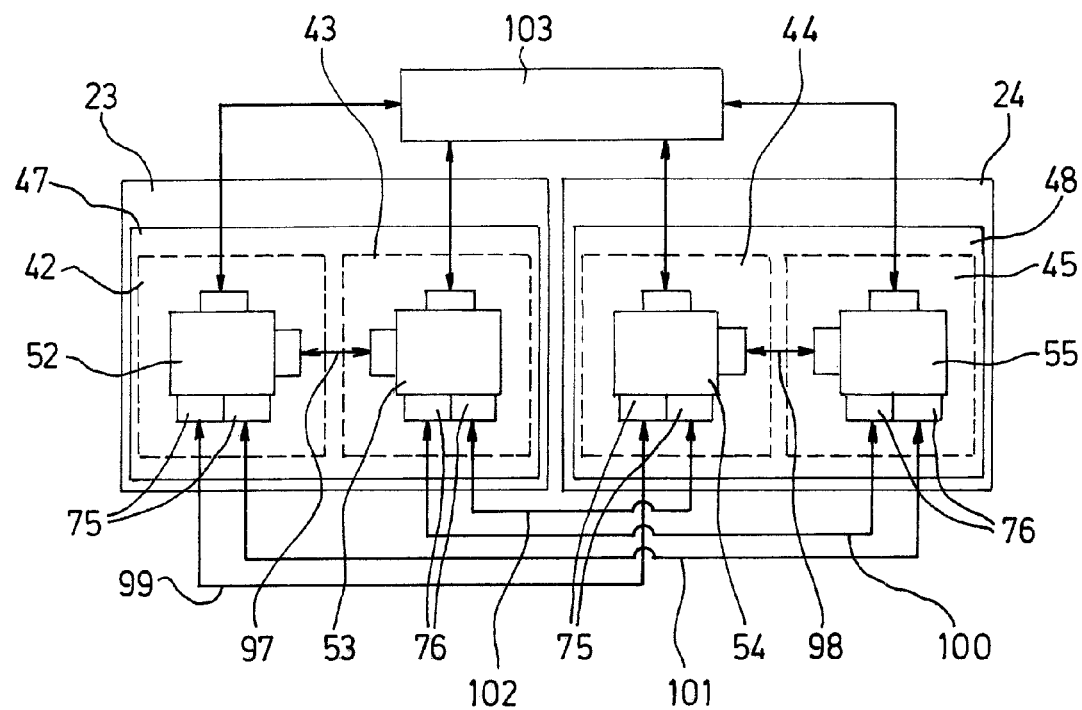
FIG. 6 is a block diagram illustrating the connections between the electronic microcontrollers of the two piloting members of a piloting device according to the invention.

FIG. 6 shows the architecture of the data links of the electronic microcontrollers 52, 53, 54, 55 of the different paths of the electronic command/monitoring units 47, 48 of the different piloting members. The four microcontrollers 52, 53, 54, 55 are connected to one another in pairs by six serial buses—the two internal serial buses 97, 98 and four external serial buses 99, 100, 101, 102 connected to the serial ports 75, 76 of the connectors 41, one pair of such serial ports 75, 76 being provided for each microcontroller.

A first external serial bus 99 connects the microcontroller 52 of the first path 42 of the electronic command/monitoring unit 47 associated with the mini-stick 21 of the captain to the microcontroller 54 of the first path 44 of the electronic command/monitoring unit 48 associated with the mini-stick 22 of the copilot. A second external serial bus 100 connects the microcontroller 53 of the second path 43 of the electronic command/monitoring unit 47 associated with the mini-stick 21 of the captain to the microcontroller 55 of the second path 45 of the electronic command/monitoring unit 48 associated with the mini-stick 22 of the copilot. A third external serial bus 101 connects the microcontroller 52 of the first path 42 of the electronic command/monitoring unit 47 associated with the mini-stick 21 of the captain to the microcontroller 55 of the second path 45 of the electronic command/monitoring unit 48 associated with the mini-stick 22 of the copilot. A fourth external serial bus 102 connects the microcontroller 53 of the second path 43 of the electronic command/monitoring unit 47 associated with the mini-stick 21 of the captain to the microcontroller 54 of the first path 44 of the electronic command/monitoring unit 48 associated with the mini-stick 22 of the copilot.

Furthermore, each microcontroller 52, 53, 54, 55 is preferably connected to a central computer system 103 of the aircraft, so as to form a CAN type network therewith.

Tables 1 and 2 below show the main signals associated with each electronic microcontroller 52, 53, 54, 55, in particular those received at their receiving inputs concerning their functionalities with regard to the invention, i.e. the commanding and the electronic operational control of the piloting members (other signals not shown in the tables may be associated with these microcontrollers, in particular concerning certain safety functions or specific movement commands of the piloting members for generating particular force feedback sensations).

Each table shows for each axis (roll or pitch) the signals received at the receiving inputs of the microcontroller coming from the sensors associated with the mini-stick controlled by the electronic command/monitoring unit to which the microcontroller belongs or with the other mini-stick.

As can be seen, each microcontroller receives at the input signals coming from the various sensors, including for at least one axis of the other mini-stick than the mini-stick controlled by the electronic command/monitoring unit to which it belongs.

Each of the microcontrollers thus constitutes both a main monitoring circuit for digital processing of the signals received from the sensors associated with the controlled mini-stick, and a cross-monitoring circuit which makes it possible to carry out the operational control of the other mini-stick, at least for one axis thereof. In practice, in the example given, the first microcontroller 52, 54 carries out on the one hand the main monitoring of the roll and pitch axes of the controlled mini-stick, and also, for each axis, the commanding of a first motor associated with this axis, and on the other hand the cross-monitoring of the pitch axis of the other mini-stick; and the second microcontroller 53, 55 carries out on the one hand the main monitoring of the roll and pitch axes of the controlled mini-stick, and also, for each axis, the commanding of a second motor associated with this axis, and on the other hand the cross-monitoring of the roll axis of the other mini-stick. It goes without saying that this architecture is merely an example and in particular that each microcontroller may carry out the cross-monitoring of both the roll and pitch axes.

TABLE 1

FIRST MICROCONTROLLER 52, 54

| axis | mini-stick concerned | signal | property with regard to electronic control unit |
|---|---|---|---|
| pitch | controlled mini-stick | torque sensor of 81 | INPUT |
| pitch | controlled mini-stick | mini-stick position sensor of 81 | INPUT |
| pitch | controlled mini-stick | mini-stick velocity sensor of 81 | INPUT |
| roll | controlled mini-stick | torque sensor of 91 | INPUT |
| roll | controlled mini-stick | mini-stick position sensor of 91 | INPUT |
| roll | controlled mini-stick | mini-stick velocity sensor of 91 | INPUT |
| pitch | other mini-stick | torque sensor of 83 | INPUT |
| pitch | other mini-stick | mini-stick position sensor of 83 | INPUT |
| pitch | other mini-stick | mini-stick velocity sensor of 83 | INPUT |
| roll | controlled mini-stick | motor position sensor of 91 | INPUT |
| roll | controlled mini-stick | motor supply current | INPUT |
| roll | controlled mini-stick | motor supply voltage | INPUT |
| roll | controlled mini-stick | motor PWM command signals | OUTPUT |
| pitch | controlled mini-stick | motor position sensor of 81 | INPUT |
| pitch | controlled mini-stick | motor supply current | INPUT |
| pitch | controlled mini-stick | motor supply voltage | INPUT |
| pitch | controlled mini-stick | motor PWM command signals | OUTPUT |
| pitch and roll | controlled mini-stick | automatic pilot engagement command | INPUT |
| pitch | controlled mini-stick | automatic pilot position command | INPUT |
| roll | controlled mini-stick | automatic pilot position command | INPUT |
| pitch and roll | both mini-sticks | serial bus 99 | INPUT/OUTPUT |
| pitch and roll | both mini-sticks | serial bus 101 or 102 | INPUT/OUTPUT |
| pitch and roll | controlled mini-stick | internal serial bus 97 or 98 | INPUT/OUTPUT |
| pitch and roll | controlled mini-stick | CAN bus | INPUT/OUTPUT |

TABLE 2

SECOND MICROCONTROLLER 53, 55

| axis | mini-stick concerned | signal | property with regard to electronic control unit |
|---|---|---|---|
| pitch | controlled mini-stick | torque sensor of 82 | INPUT |
| pitch | controlled mini-stick | mini-stick position sensor of 82 | INPUT |
| pitch | controlled mini-stick | mini-stick velocity sensor of 82 | INPUT |
| roll | controlled mini-stick | torque sensor of 92 | INPUT |
| roll | controlled mini-stick | mini-stick position sensor of 92 | INPUT |
| roll | controlled mini-stick | mini-stick velocity sensor of 92 | INPUT |
| roll | other mini-stick | torque sensor of 93 | INPUT |
| roll | other mini-stick | mini-stick position sensor of 93 | INPUT |
| roll | other mini-stick | mini-stick velocity sensor of 93 | INPUT |
| roll | controlled mini-stick | motor position sensor of 92 | INPUT |
| roll | controlled mini-stick | motor supply current | INPUT |
| roll | controlled mini-stick | motor supply voltage | INPUT |
| roll | controlled mini-stick | motor PWM command signals | OUTPUT |
| pitch | controlled mini-stick | motor position sensor of 82 | INPUT |
| pitch | controlled mini-stick | motor supply current | INPUT |
| pitch | controlled mini-stick | motor supply voltage | INPUT |
| pitch | controlled mini-stick | motor PWM command signals | OUTPUT |
| pitch and roll | controlled mini-stick | automatic pilot engagement command | INPUT |
| pitch | controlled mini-stick | automatic pilot position command | INPUT |
| roll | controlled mini-stick | automatic pilot position command | INPUT |
| pitch and roll | both mini-sticks | serial bus 100 | INPUT/OUTPUT |
| pitch and roll | both mini-sticks | serial bus 102 or 101 | INPUT/OUTPUT |
| pitch and roll | controlled mini-stick | internal serial bus 97 or 98 | INPUT/OUTPUT |
| pitch and roll | controlled mini-stick | CAN bus | INPUT/OUTPUT |

Figure 7:
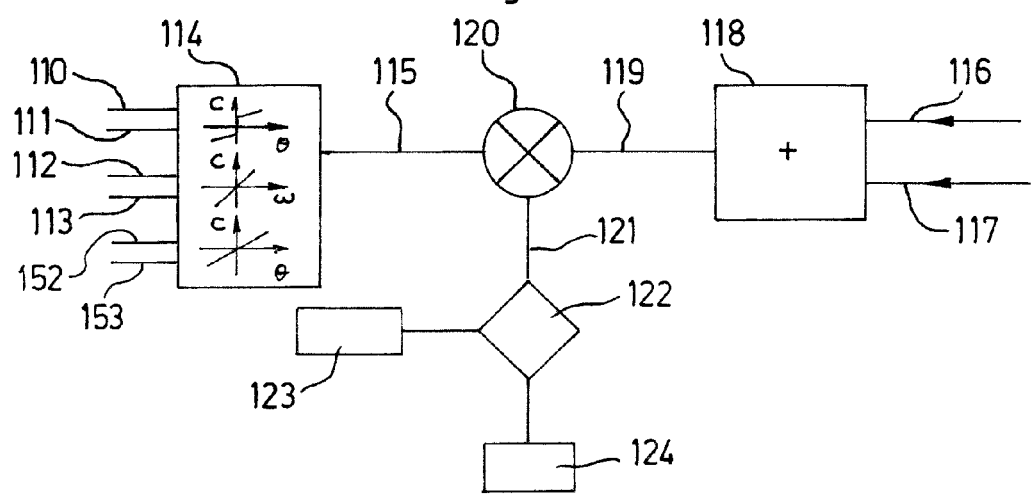
FIG. 7 is a logic diagram illustrating an example of logic employed for the cross-monitoring in a device according to the invention.

FIG. 7 shows the logic employed by each electronic microcontroller 52 to 55 for the cross-monitoring on one of the two axes 25, 26. For this axis 25, 26, the electronic microcontroller receives the signals coming from the sensors 27 to 30, namely at least a position signal 110 (value of angle of rotation θ) of the controlled mini-stick 21, 22, and a position signal 111 of the other mini-stick 22, 21. It also preferably receives a velocity signal 112 of the controlled mini-stick and a velocity signal 113 of the other mini-stick 22, 21. These velocity signals 112, 113 may come from velocity sensors or be calculated by differentiation with respect to the time of the position signals θ(t) coming from the sensors measuring the angular position of each mini-stick over time. The electronic microcontroller also preferably receives a signal 152 representing the acceleration of the controlled mini-stick 21, 22 and a signal 153 representing the acceleration of the other mini-stick 22, 21. These acceleration signals 152, 153 may come from angular acceleration sensors or be calculated by double differentiation with respect to the time of the position signals θ(t) coming from the sensors measuring the angular position of each mini-stick over time.

Based on these signals, the electronic microcontroller 52 to 55 is adapted to execute a module 114 for calculating a value representing the theoretical forces. This calculating module 114 applies predetermined laws (represented by stored data, for example in the form of tables) which make it possible to calculate, for each axis of each mini-stick, the theoretical torque corresponding to the angular position, and, where appropriate, preferably also the theoretical torque corresponding to the angular velocity of this axis and/or the theoretical torque corresponding to the angular acceleration of this axis.

When the two mini-sticks 21, 22 are logically and electronically coupled to one another by the electronic command/monitoring units 47, 48, the calculating module 114 calculates, for each axis of each mini-stick, a theoretical value 115 of the torque which is to be imparted to one of the axes for each piloting member 21, 22. This theoretical value 115 is the algebraic sum (taking account of the signs, i.e. the directions of the torques) of the theoretical torques corresponding to the angular position, the angular velocity and the angular acceleration previously calculated. It should be noted that as soon as the two mini-sticks 21, 22 are coupled, the theoretical value 115 for one of the mini-sticks is the same as that obtained for the other mini-stick.

Furthermore, the electronic microcontroller 52 to 55 also receives, for the axis considered, the values coming from the force sensors 31, 32, i.e. a signal 116 of the torque measured on the axis for the controlled mini-stick 21, 22, and a signal 117 of the torque measured on the axis for the other mini-stick 22, 21. The electronic microcontroller 52 to 55 executes a module 118 producing the algebraic sum (taking account of the signs, i.e. the directions of the torques) of the measured torques, this module 118 supplying a value 119 representing this algebraic sum of the measured cumulated forces. The electronic microcontroller 52 to 55 executes a module 120 which calculates the difference 121 between the theoretical value 115 and the value 119 representing the algebraic sum of the measured torques, and a module 122 which compares this difference value 121 with a stored predetermined threshold value 123. When the value 121 is greater as an absolute value than the threshold value 123, the microcontroller 52 to 55 emits a signal 124 representing the existence of an operating fault. This cross-monitoring carried out via the algebraic sum of the signals of the measured torques of the two piloting members and detection of a deviation on this sum is particularly simple and amply sufficient. Nevertheless, in a variant, any other function for combining the signals of the two piloting members may be used, in particular in polynomial form or the like.

If the two mini-sticks 21, 22 are not coupled electronically, i.e. are independent of one another, the theoretical value 115 (which is still, for the mini-stick 21, 22 considered, the algebraic sum of the theoretical torques due to the angular position, the angular velocity and the angular acceleration, where appropriate), is compared with the value of the signal 116, or 117, of the torque measured on the axis of the mini-stick 21, 22 considered by the module 120 which calculates a difference between these values, this difference once again being compared as an absolute value with a threshold value, the electronic microcontroller emitting a signal representing the existence of a fault if this threshold value is exceeded.

Figure 8:
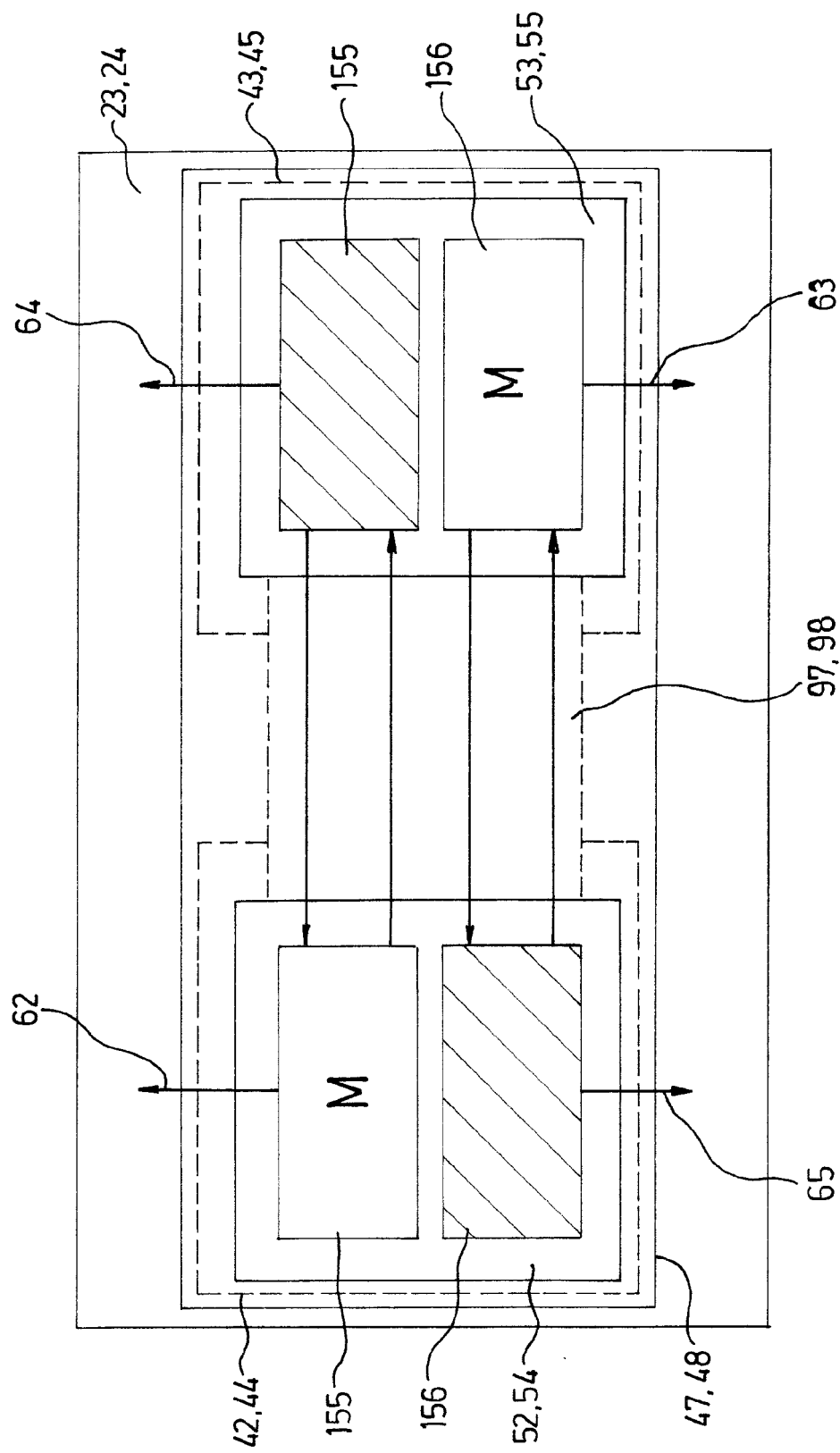
FIG. 8 is a block diagram illustrating the architecture for normal operation of the electronic control unit of a piloting member of a piloting device according to the invention.

FIG. 8 shows the state of one of the electronic command/monitoring units 47, 48 in normal operation. Each electronic command/monitoring unit 47, 48 supplies the command signals 62, 64; 63, 65 simultaneously for the two motors 35, 36 of each axis of the controlled mini-stick. For each axis, the first microcontroller 52, 54 supplies a signal for commanding a first motor at 50% of the torque which is to be imparted to this axis, and the second microcontroller 53, 55 supplies a signal for commanding a second motor at 50% of the torque which is to be imparted to this axis.

In addition, each microcontroller is multifunctional and performs on the one hand motor command functionalities for each degree of freedom according to position and velocity servo loops for the generation of force feedback sensations, and, on the other hand, command signal monitoring functionalities which make it possible to avoid the deviations and detect the faults.

In normal operation, when one of the electronic microcontrollers 52, 54, or 53, 55 of an electronic command/monitoring unit 47, 48 performs command functions on one of the axes of the controlled mini-stick, the other electronic microcontroller 53, 55, or 52, 54 of this same electronic command/monitoring unit 47, 48 performs monitoring functions on this axis.

Furthermore, the two electronic microcontrollers of a same electronic command/monitoring unit 47, 48 are associated with one another so as to function as master/slave. The master electronic microcontroller performs the functions of commanding and monitoring of the current of one of the motors on one of the axes, and the slave microcontroller performs functions of monitoring and controlling of the current of the other motor of the same axis. When one electronic microcontroller is the master on one axis, it is the slave for the other axis.

Figure 9:
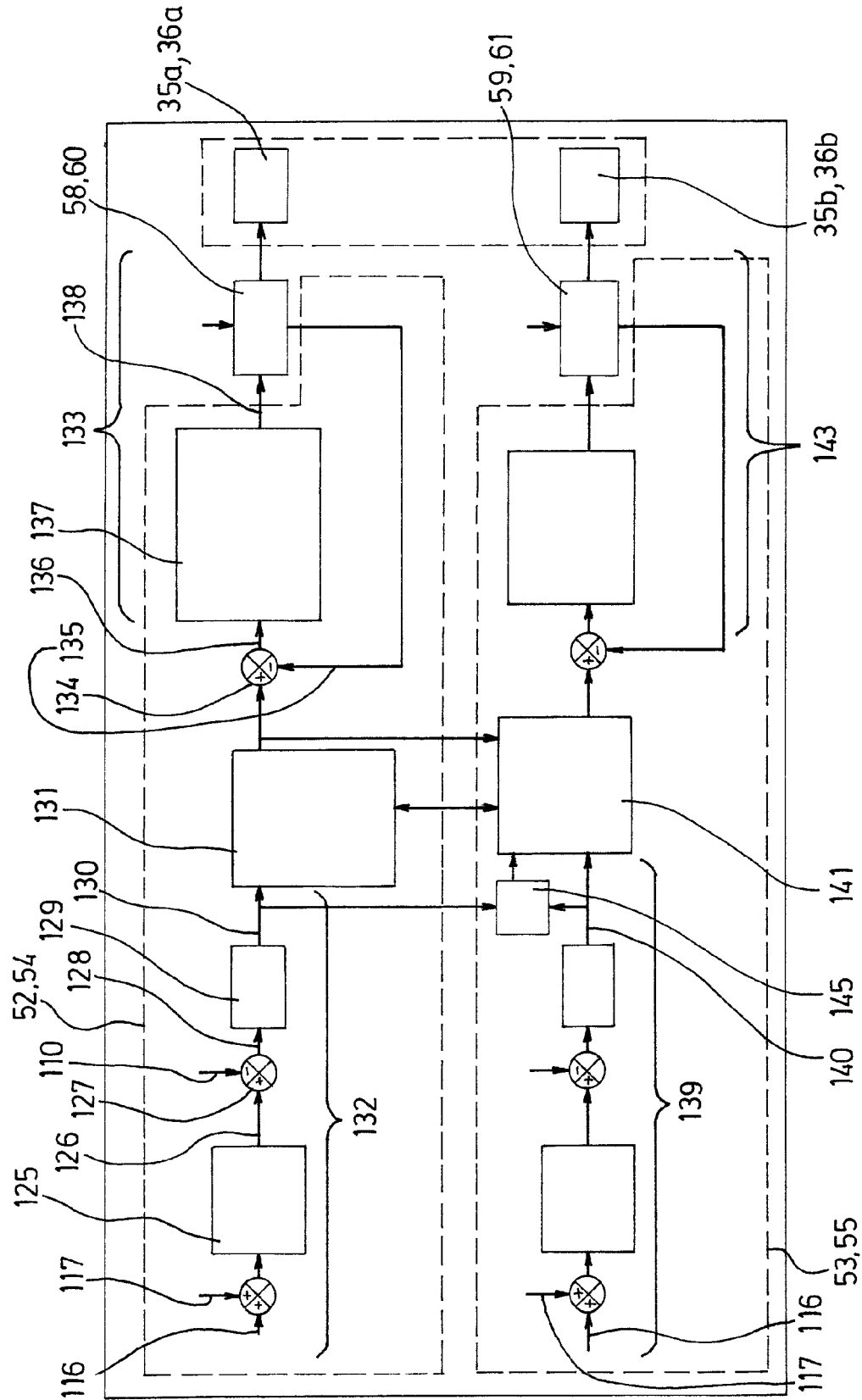
FIG. 9 is a block diagram illustrating the automatic controls employed for the operational control of a piloting member of a piloting device according to the invention.

FIG. 9 illustrates an exemplary embodiment of such master/slave operating logic for the microcontrollers of one of the electronic command/monitoring units 47, 48 for one of the axes 21, 22.

The master operation is as follows:

The first microcontroller 52, 54 receives the signals 116, 117 of the forces measured on the axis, calculates the algebraic sum thereof and executes a module 125 which makes it possible to apply the above-mentioned predetermined law connecting the position and torque, in order to supply a value 126 representing a theoretical reference position of the axis of the controlled mini-stick. The module 127 calculates the difference 128 between this value 126 and the value of the signal 110 for measuring the position of the controlled mini-stick. This difference 128 is used by a module 129 for calculating a torque desired value 130. This module 129 executes a predetermined automatic control, for example of the PID (proportional-integral-derivative) type. The first microcontroller 52, 54 therefore in this way implements a position servo loop 132 based on the measured torque values 116, 117.

The torque desired value 130 is supplied to a fault detection module 131, then to the input of a current servo loop 133 of one 35a, 36a of the motors for actuating the axis. This loop 133 comprises a module 134 which compares the desired value 130 with a value 135 representing the measured torque actually supplied to the motor by the supply circuit 58, 60. This value 135 is for example a measured value of a current supplied by the supply circuit 58, 60. The difference 136 between the desired value 130 and the measured value 135 is supplied to a module 137 which executes an automatic control (for example of the PID type) for controlling the current which delivers a command signal 138 for the supply circuit 58, 60 which supplies the motor 35a, 36a as a function of this signal 138.

The slave operation is as follows:

The second microcontroller 53, 55 comprises a position servo loop 139 based on the measured forces 116, 117, this loop 139 being identical to the position servo loop 132 employed by the first microcontroller 52, 54. This loop 139 therefore also supplies a torque desired value 140 which is supplied to a fault detection module 141, then to the input of a current servo loop 143 of the other 35b, 36b of the motors for actuating the axis. This current servo loop 143 is identical to the current servo loop 133 employed by the first electronic microcontroller 52, 54.

Furthermore, the torque desired value 130 produced by the first electronic microcontroller 52, 54 is supplied to the second electronic microcontroller 53, 55 and used by an operational control module 145 executed by this second electronic microcontroller 53, 55 to compare it with the torque desired value 140 produced by the latter. This module 145 detects a difference between these two values 130, 140, and compares this difference, as an absolute value, with a predetermined threshold value. If this threshold value is exceeded, the module 145 generates an operating fault signal used for example by the module 141. Thus, the second electronic microcontroller 53, 55 carries out a slave operational control of the first electronic microcontroller 52, 54.

As can be seen from FIG. 8, the two microcontrollers exchange the torque desired value signals 130, 140 on the internal serial bus 97, 98 in full duplex, each signal having a master or slave status, as the case may be. In FIG. 8, the blocks 155 and 156, respectively, representing the microcontrollers represent the status of the microcontroller with regard to each axis 25 and 26, respectively. A master command status is represented by hatching, and a slave command status is represented by an absence of hatching in the corresponding part of the block 155, 156. A function for operational control of the axis 25, 26 is represented by insertion of the letter "M" in the block 155, 156.

Figure 10:
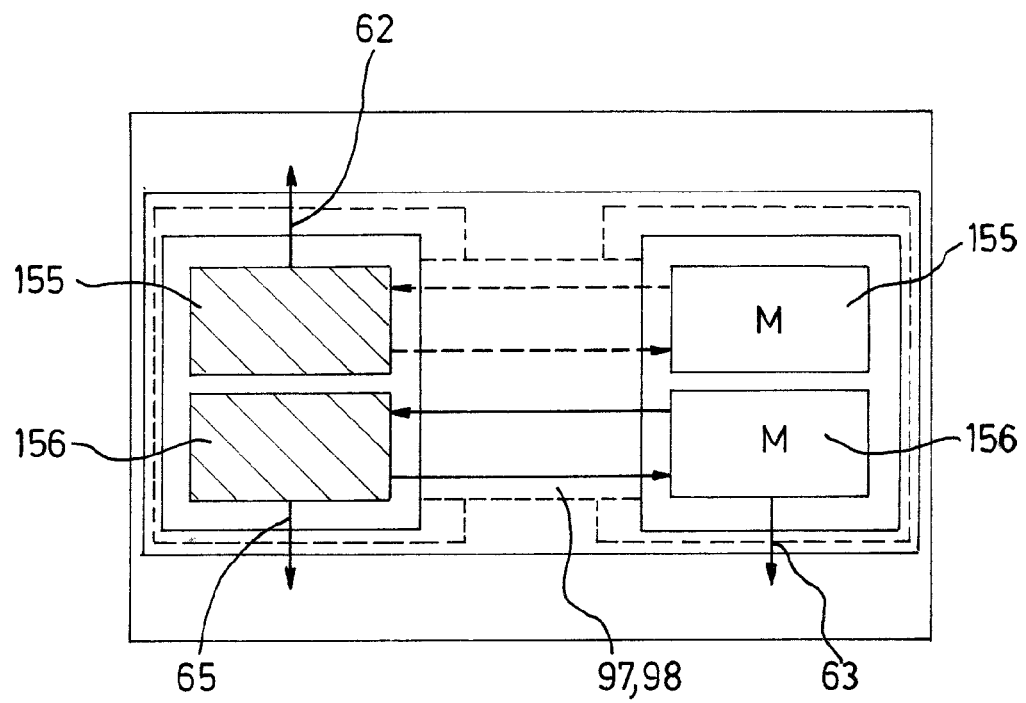
FIGS. 10 and 11 are similar to FIG. 8 and show the architecture for operation in the event of an electrical supply or operating fault of the motor on one degree of freedom, and, respectively, in the event of an operating fault of one of the electronic microcontrollers.

FIG. 10 is similar to FIG. 8 but shows the state of the electronic command/monitoring unit 47, 48 in the event of a fault on at least one electrical supply circuit 58 to 61 of a motor or on at least one motor 35, 36. In the example shown, the existence of such a fault on the operation of the second motor 35b for actuating the pitch axis 25 normally master-commanded via the second path 43, 45 is assumed. As can be seen, the electronic command/monitoring unit is itself reconfigured such that the first microcontroller 52, 54 which is normally the slave becomes the master and that the command signal 62 for the first motor 35a controls 100% of the torque to be delivered on this axis 25. In addition, the second microcontroller 53, 55 is also reconfigured to provide slave operational control on the pitch axis 25.

Figure 11:
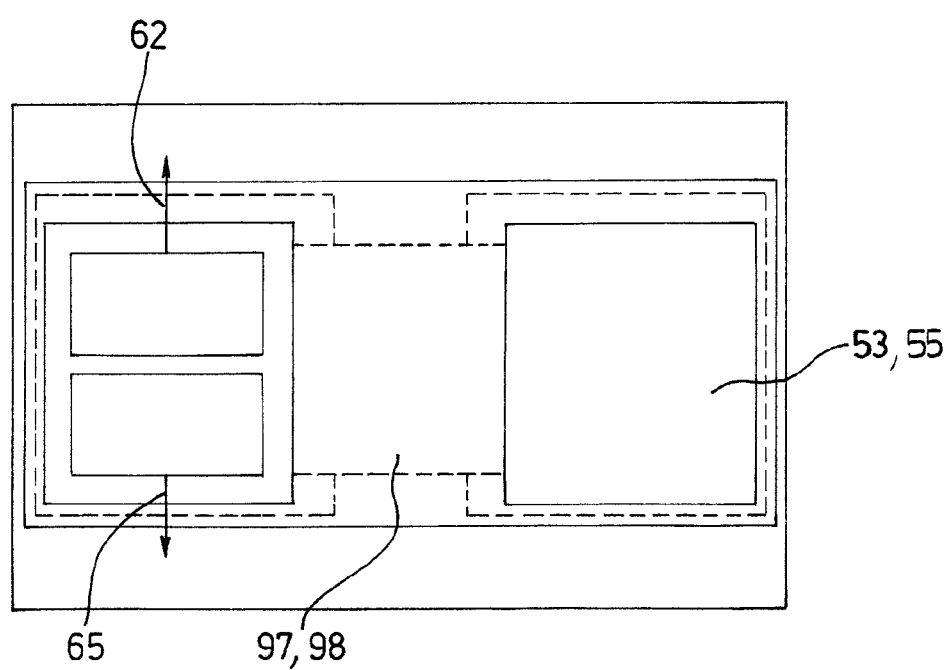

FIG. 11 shows the state of the electronic command/monitoring unit 47, 48 in the event of a fault on one of the microcontrollers, namely the second microcontroller 53, 55 in the example shown. The electronic command/monitoring unit 47, 48 is itself reconfigured so that the other electronic microcontroller 52, 54 becomes the master in the commands on the two axes and supplies 100% of the torque by the command signals 62 and 65, respectively.

The invention makes it possible to ensure total resistance of the device to a single failure and to do so in an extremely simple, efficient and economical manner. It may have numerous variant embodiments and applications.

The invention claimed is:

1. An electronic operational control device for a controlled piloting member of an aircraft piloting device including said controlled piloting member and another piloting member, the two piloting members both being connected to at least one same flying member of an aircraft, said controlled piloting member being mounted on a first electromechanical supporting box with at least one degree of freedom, the first electromechanical supporting box including, for each degree of freedom, at least one motor configured to actuate the controlled piloting member, said other piloting member being mounted on a second electromechanical supporting box with at least one degree of freedom, said second electromechanical supporting box including, for each degree of freedom, at least one motor configured to actuate said other piloting member, the electronic operational control device comprising:

main monitoring inputs configured to receive signals delivered by sensors associated with the controlled piloting member;

electronic main monitoring circuits configured to digitally process the signals received at the main monitoring inputs and to detect any deviation of the signals corresponding to an operating fault and to generate a signal representing the operating fault;

cross-monitoring inputs configured to receive cross-monitored signals delivered by sensors associated with the other piloting member; and at least one cross-monitoring electronic circuit configured to digitally process said cross-monitored signals delivered by the sensors associated with the other piloting member, said cross-monitoring circuit being configured to detect any deviation of said cross-monitored signals corresponding to the operating fault and to generate a signal representing the operating fault, wherein the device is encapsulated in a box adapted to be able to be mounted on said electromechanical supporting box of the controlled piloting member, the two piloting members are movable with the same degrees of freedom with respect to a frame of the aircraft, one of the cross-monitoring circuits being specific to each degree of freedom, for each degree of freedom of the controlled piloting member and of the other piloting member, the main monitoring circuit comprises a first electronic microcontroller configured to digitally process the signals delivered by the sensors associated with the controlled piloting member, and the cross-monitoring circuit comprises another electronic microcontroller which processes the signals delivered by the sensors associated with the other piloting member, each other electronic microcontroller being distinct from said first electronic microcontroller.

2. The device according to claim 1, wherein said cross-monitoring inputs have at least one input configured to receive at least one crossed-monitored position signal of the other piloting member, delivered by one of the position sensors associated with the other piloting member.

3. The device according to claim 1, wherein said cross-monitoring inputs have at least one input configured to receive at least one crossed-monitored force signal representing forces actually exerted on the other piloting member delivered by a force sensor associated with said other piloting member, and
said cross-monitoring circuit is configured to compare a force measured value, determined at least from said force signal, with a predetermined and/or measured and/or calculated reference value.

4. The device according to claim 3, wherein said reference value is a value calculated according to a predetermined law from at least one position signal of the other piloting member.

5. The device according to claim 3, wherein said cross-monitoring circuit is configured to compare a difference between said force measured value and said reference value with a predetermined threshold value, and to generate a signal representing an operating fault when the difference exceeds said predetermined threshold value.

6. The device according to claim 1, wherein the at least one cross-monitoring circuit is configured to calculate an algebraic sum of a force measured value delivered by at least one force sensor associated with the controlled piloting member and of a force measured value delivered by at least one force sensor associated with the other piloting member, and to process the sum and detect any deviation of the sum corresponding to an operating fault.

7. A piloting device of an aircraft, the piloting device comprising:
two piloting members both connected to at least one same flying member of the aircraft; and
an electronic operational control device for each piloting member according to claim 1 with cross-monitoring specific to each piloting member.

8. The piloting device according to claim 7, wherein the two electronic operational control devices with cross-monitoring are identical.

9. The piloting device according to claim 7, wherein each piloting member is mounted on an electromechanical supporting box comprising, for each degree of freedom, at least one motor configured to actuate the piloting member, and a device configured to command each actuating motor adapted to create an electrically simulated variable force feedback sensation in the piloting member.

10. An aircraft comprising a piloting device according to claim 7.

11. The device according to claim 1, wherein the two piloting members are sticks movable with respect to the frame of the aircraft on a longitudinal horizontal pivot axis to enable a roll command, and
the device further comprising:
roll main monitoring inputs configured to receive signals delivered by at least one roll angular position sensor of the controlled piloting member, and by at least one roll force sensor of the controlled piloting member,
roll cross-monitoring inputs configured to receive cross-monitored signals delivered by at least one roll position sensor of the other piloting member, and by at least one roll force sensor of the other piloting member, and
a roll cross-monitoring circuit configured to determine for each piloting member a theoretical force value according to at least one predetermined law from at least roll angular position signals of the piloting member, compare the theoretical force value with a measured force value delivered by at least one roll force sensor of a piloting member, and generate the operating fault signal when a difference between the values is, as an absolute value, greater than a predetermined threshold value.

12. The device according to claim 1, wherein the two piloting members are sticks movable with respect to the frame of the aircraft on a transverse horizontal pivot axis to enable a pitch command, and
the device further comprising:
pitch main monitoring inputs configured to receive signals delivered by at least one pitch position sensor of the controlled piloting member, and by at least one pitch force sensor of the controlled piloting member,
pitch cross-monitoring inputs configured to receive cross-monitored signals delivered by at least one pitch position sensor of the other piloting member, and at least one pitch force sensor of the other piloting member, and
a pitch cross-monitoring circuit configured to determine for each piloting member, a theoretical force value according to at least one predetermined law from at least pitch angular position signals of the piloting member, compare the theoretical force value with a measured force value delivered by at least one pitch force sensor of a piloting member, and generate the operating fault signal when a difference between the values is, as an absolute value, greater than a predetermined threshold value.

13. An electronic operational control device for a controlled piloting member of an aircraft piloting device including said controlled piloting member and another piloting member, the two piloting members both being connected to at least one same flying member of an aircraft, the two piloting members being sticks movable with respect to a frame of the aircraft on a longitudinal horizontal pivot axis to enable a roll command, said controlled piloting member being mounted on a first electromechanical supporting box with at least one degree of freedom, the first electromechanical supporting box including, for each degree of freedom, at least one motor configured to actuate the controlled piloting member, said other piloting member being mounted on a second electromechanical supporting box with at least one degree of freedom, said second electromechanical supporting box including, for each degree of freedom, at least one motor configured to actuate said other piloting member, the electronic operational control device comprising:
main monitoring inputs configured to receive signals delivered by sensors associated with the controlled piloting member;
electronic main monitoring circuits configured to digitally process the signals received at the main monitoring inputs and to detect any deviation of the signals corresponding to an operating fault and to generate a signal representing the operating fault;
cross-monitoring inputs configured to receive cross-monitored signals delivered by sensors associated with the other piloting member;
at least one cross-monitoring electronic circuit configured to digitally process said cross-monitored signals delivered by the sensors associated with the other piloting member, said cross-monitoring circuit being configured to detect any deviation of said cross-monitored signals corresponding to the operating fault and to generate a signal representing the operating fault;

roll main monitoring inputs configured to receive signals delivered by at least one roll angular position sensor of the controlled piloting member, and by at least one roll force sensor of the controlled piloting member;

roll cross-monitoring inputs configured to receive cross-monitored signals delivered by at least one roll position sensor of the other piloting member, and by at least one roll force sensor of the other piloting member; and a roll cross-monitoring circuit configured to determine for each piloting member a theoretical force value according to at least one predetermined law from at least roll angular position signals of the piloting member, compare the theoretical force value with a measured force value delivered by at least one roll force sensor of a piloting member, and generate the operating fault signal when a difference between the values is, as an absolute value, greater than a predetermined threshold value, wherein the device is encapsulated in a box adapted to be able to be mounted on said electromechanical supporting box of the controlled piloting member, and the two piloting members are movable with the same degrees of freedom with respect to a frame of the aircraft, one of the cross-monitoring circuits being specific to each degree of freedom.

14. The device according to claim 13, wherein said cross-monitoring inputs have at least one input configured to receive at least one crossed-monitored position signal of the other piloting member, delivered by one of the position sensors associated with the other piloting member.

15. The device according to claim 13, wherein said cross-monitoring inputs have at least one input configured to receive at least one crossed-monitored force signal representing forces actually exerted on the other piloting member delivered by a force sensor associated with said other piloting member, and said cross-monitoring circuit is configured to compare a force measured value, determined at least from said force signal, with a predetermined and/or measured and/or calculated reference value.

16. The device according to claim 15, wherein said reference value is a value calculated according to a predetermined law from at least one position signal of the other piloting member.

17. The device according to claim 15, wherein said cross-monitoring circuit is configured to compare a difference between said force measured value and said reference value with a predetermined threshold value, and to generate a signal representing an operating fault when the difference exceeds said predetermined threshold value.

18. The device according to claim 13, wherein at least one cross-monitoring circuit is configured to calculate an algebraic sum of a force measured value delivered by at least one force sensor associated with the controlled piloting member and of a force measured value delivered by at least one force sensor associated with the other piloting member, and to process the sum and detect any deviation of the sum corresponding to an operating fault.

19. The device according to claim 13, wherein the two piloting members are sticks movable with respect to the frame of the aircraft on a transverse horizontal pivot axis to enable a pitch command, and the device further comprising:

pitch main monitoring inputs configured to receive signals delivered by at least one pitch position sensor of the controlled piloting member, and by at least one pitch force sensor of the controlled piloting member, pitch cross-monitoring inputs configured to receive cross-monitored signals delivered by at least one pitch position sensor of the other piloting member, and at least one pitch force sensor of the other piloting member, and a pitch cross-monitoring circuit configured to determine for each piloting member, a theoretical force value according to at least one predetermined law from at least pitch angular position signals of the piloting member, compare the theoretical force value with a measured force value delivered by at least one pitch force sensor of a piloting member, and generate the operating fault signal when a difference between the values is, as an absolute value, greater than a predetermined threshold value.

20. A piloting device of an aircraft, the piloting device comprising:

two piloting members both connected to at least one same flying member of the aircraft; and an electronic operational control device for each piloting member according to claim 13 with cross-monitoring specific to each piloting member.

21. The piloting device according to claim 18, wherein the two electronic operational control devices with cross-monitoring are identical.

22. The piloting device according to claim 18, wherein each piloting member is mounted on an electromechanical supporting box comprising, for each degree of freedom, at least one motor configured to actuate the piloting member, and a device configured to command each actuating motor adapted to create an electrically simulated variable force feedback sensation in the piloting member.

23. An aircraft comprising a piloting device according to claim 18.

24. An electronic operational control device for a controlled piloting member of an aircraft piloting device including said controlled piloting member and another piloting member, the two piloting members both being connected to at least one same flying member of an aircraft, the two piloting members being sticks movable with respect to a frame of the aircraft on a transverse horizontal pivot axis to enable a pitch command, said controlled piloting member being mounted on a first electromechanical supporting box with at least one degree of freedom, the first electromechanical supporting box including, for each degree of freedom, at least one motor configured to actuate the controlled piloting member, said other piloting member being mounted on a second electromechanical supporting box with at least one degree of freedom, said second electromechanical supporting box including, for each degree of freedom, at least one motor configured to actuate said other piloting member, the electronic operational control device comprising:

main monitoring inputs configured to receive signals delivered by sensors associated with the controlled piloting member;

electronic main monitoring circuits configured to digitally process the signals received at the main monitoring inputs and to detect any deviation of the signals corresponding to an operating fault and to generate a signal representing the operating fault;

cross-monitoring inputs configured to receive cross-monitored signals delivered by sensors associated with the other piloting member;

at least one cross-monitoring electronic circuit configured to digitally process said cross-monitored signals delivered by the sensors associated with the other piloting member, said cross-monitoring circuit being configured to detect any deviation of said cross-monitored signals corresponding to the operating fault and to generate a signal representing the operating fault;

pitch main monitoring inputs configured to receive signals delivered by at least one pitch position sensor of the controlled piloting member, and by at least one pitch force sensor of the controlled piloting member;

pitch cross-monitoring inputs configured to receive cross-monitored signals delivered by at least one pitch position sensor of the other piloting member, and at least one pitch force sensor of the other piloting member; and a pitch cross-monitoring circuit configured to determine for each piloting member, a theoretical force value according to at least one predetermined law from at least pitch angular position signals of the piloting member, compare the theoretical force value with a measured force value delivered by at least one pitch force sensor of a piloting member, and generate the operating fault signal when a difference between the values is, as an absolute value, greater than a predetermined threshold value, wherein the device is encapsulated in a box adapted to be able to be mounted on said electromechanical supporting box of the controlled piloting member, and the two piloting members are movable with the same degrees of freedom with respect to a frame of the aircraft, one of the cross-monitoring circuits being specific to each degree of freedom.

25. The device according to claim 24, wherein said cross-monitoring inputs have at least one input configured to receive at least one crossed-monitored force signal representing forces actually exerted on the other piloting member delivered by a force sensor associated with said other piloting member, and said cross-monitoring circuit is configured to compare a force measured value, determined at least from said force signal, with a predetermined and/or measured and/or calculated reference value.

26. The device according to claim 23, wherein said reference value is a value calculated according to a predetermined law from at least one position signal of the other piloting member.

27. The device according to claim 23, wherein said cross-monitoring circuit is configured to compare a difference between said force measured value and said reference value with a predetermined threshold value, and to generate a signal representing an operating fault when the difference exceeds said predetermined threshold value.

28. The device according to claim 24, wherein at least one cross-monitoring circuit is configured to calculate an algebraic sum of a force measured value delivered by at least one force sensor associated with the controlled piloting member and of a force measured value delivered by at least one force sensor associated with the other piloting member, and to process the sum and detect any deviation of the sum corresponding to an operating fault.

29. A piloting device of an aircraft, the piloting device comprising:

two piloting members both connected to at least one same flying member of the aircraft; and an electronic operational control device for each piloting member according to claim 24 with cross-monitoring specific to each piloting member.

30. The piloting device according to claim 27, wherein the two electronic operational control devices with cross-monitoring are identical.

31. The piloting device according to claim 27, wherein each piloting member is mounted on an electromechanical supporting box comprising, for each degree of freedom, at least one motor configured to actuate the piloting member, and a device configured to command each actuating motor adapted to create an electrically simulated variable force feedback sensation in the piloting member.

32. An aircraft comprising a piloting device according to claim 27.

33. The device according to claim 24, wherein said cross-monitoring inputs have at least one input configured to receive at least one crossed-monitored position signal of the other piloting member, delivered by one of the position sensors associated with the other piloting member.

* * * * *